United States Patent
Dietrich et al.

(10) Patent No.: US 12,510,147 B2
(45) Date of Patent: Dec. 30, 2025

(54) OIL COLLECT PAN

(71) Applicant: Schaeffler Technologies AG & Co. KG, Herzogenaurach (DE)

(72) Inventors: Bastian Dietrich, Neustadt an der Aisch (DE); Alfred Hock, Höchstadt / Aisch (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/719,883

(22) PCT Filed: Dec. 6, 2022

(86) PCT No.: PCT/DE2022/100910
§ 371 (c)(1),
(2) Date: Jun. 14, 2024

(87) PCT Pub. No.: WO2023/110015
PCT Pub. Date: Jun. 22, 2023

(65) Prior Publication Data
US 2025/0052314 A1 Feb. 13, 2025

(30) Foreign Application Priority Data
Dec. 14, 2021 (DE) .................. 10 2021 132 888.8

(51) Int. Cl.
*F16H 57/04* (2010.01)
(52) U.S. Cl.
CPC .............................. *F16H 57/0427* (2013.01)

(58) Field of Classification Search
CPC ............ F16H 57/0479; F16H 57/0486; F16H 57/0408
(Continued)

(56) References Cited

U.S. PATENT DOCUMENTS

| | | | | |
|---|---|---|---|---|
| 5,643,126 A | * | 7/1997 | Hotta | F16H 57/0482 184/6.12 |
| 2009/0247348 A1 | * | 10/2009 | Haupt | F16C 33/6677 475/159 |

(Continued)

FOREIGN PATENT DOCUMENTS

| | | |
|---|---|---|
| DE | 102008000900 A1 | 10/2009 |
| DE | 102011005724 A1 | 9/2012 |

(Continued)

*Primary Examiner* — Anna M Momper
*Assistant Examiner* — Mark K Buse

(57) ABSTRACT

An oil collecting tray includes a disc-shaped tray bottom, an annular collecting portion, recesses, snap elements and axially protruding ribs. The disc-shaped tray bottom includes a first side and a second side, opposite the first side, and radially protruding body portions. Each of the body portions includes an oil supply opening. The annular collecting portion projects axially from the first side. The annular collecting portion and the disc-shaped tray bottom are arranged to define a collection space, and the annular collecting portion delimits a radial outside of the collection space. The recesses are arranged on the second side, and each one is arranged between a pair of the body portions. Each of the snap elements protrudes axially from one of the recesses. The ribs are arranged on the first side and each one is arranged opposite one of the snap elements.

18 Claims, 3 Drawing Sheets

(58) Field of Classification Search
USPC .......................................................... 184/106
See application file for complete search history.

(56) References Cited

U.S. PATENT DOCUMENTS

| | | | |
|---|---|---|---|
| 2024/0011551 A1* | 1/2024 | Keck ..................... | F16H 57/082 |
| 2024/0093775 A1* | 3/2024 | Schimpf ............. | F16H 57/0427 |
| 2024/0426375 A1* | 12/2024 | Heymel ............. | F16H 57/0479 |

FOREIGN PATENT DOCUMENTS

| | | | | |
|---|---|---|---|---|
| DE | 102012217311 A1 | | 3/2014 | |
| DE | 102012217307 A1 | | 5/2014 | |
| DE | 102013206880 | * | 7/2014 | ......... F16H 57/0427 |
| DE | 102013206880 B3 | | 7/2014 | |
| DE | 102020102241 B3 | | 4/2021 | |
| DE | 102020131946 A1 | | 6/2022 | |
| DE | 102021201504 A1 | | 8/2022 | |

* cited by examiner

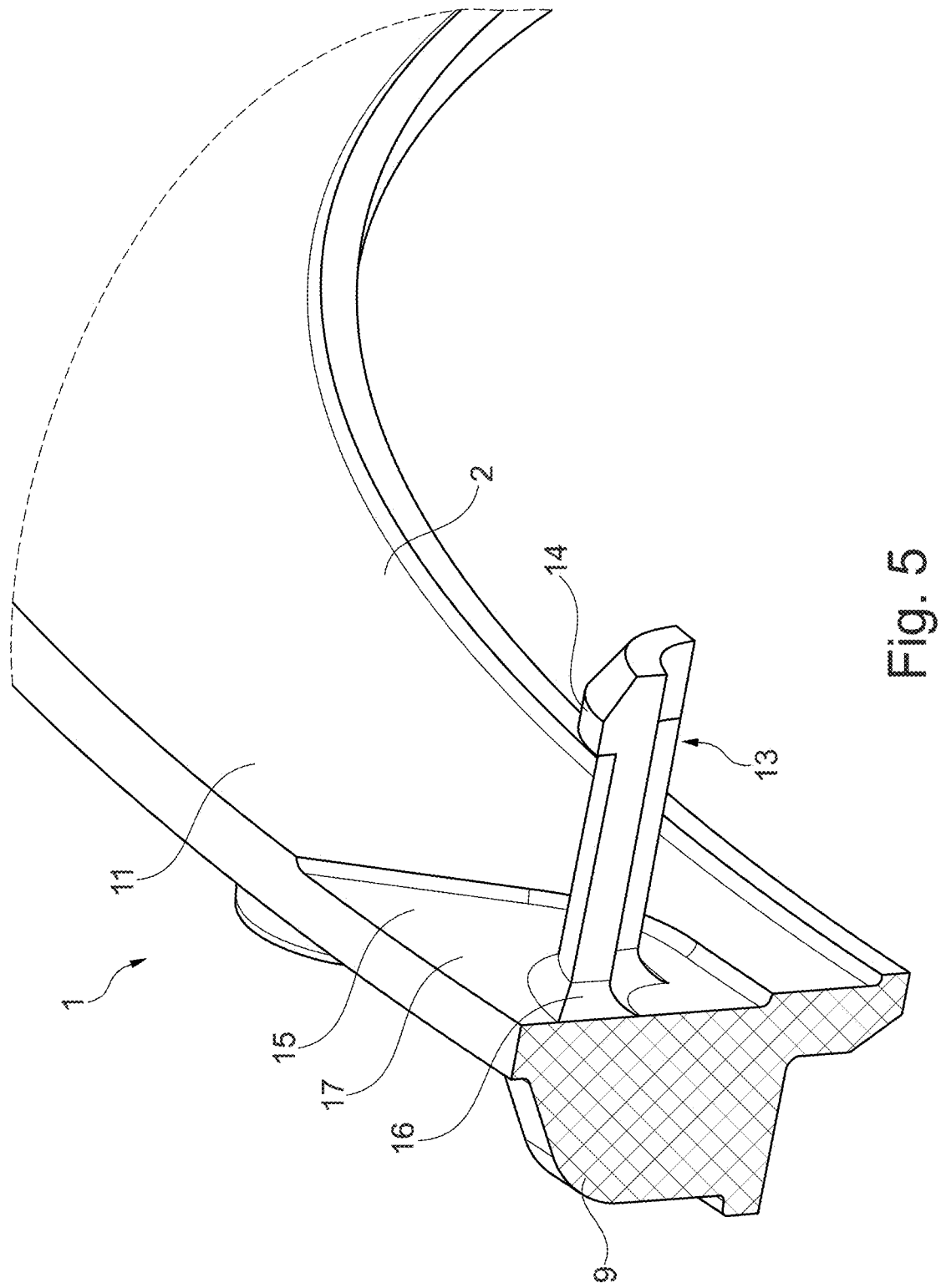

OIL COLLECT PAN

CROSS-REFERENCE TO RELATED APPLICATIONS

This application is the United States National Phase of PCT Appln. No. PCT/DE2022/100910 filed Dec. 6, 2022, which claims priority to German Application No. DE102021132888.8 filed Dec. 14, 2021, the entire disclosures of which are incorporated by reference herein.

TECHNICAL FIELD

The present disclosure relates to an annular oil collecting tray, having a disc-shaped tray bottom which has multiple radially protruding body portions, and an annular collecting portion which axially projects from the tray bottom on a first side and which defines, together with the tray bottom, a collection space which is delimited radially outwards.

BACKGROUND

Such an annular oil collecting tray, as known for example from DE 10 2020 102 241 B3, is usually part of a planetary gearbox. The oil collecting tray is arranged on a planet carrier, on which multiple planet gears are rotatably mounted on corresponding bearing bolts fixed on the carrier side. The oil collecting tray is used to collect oil sprayed into the transmission compartment, for which purpose a channel-like collection space is formed on the tray in which the oil collects. Due to the rotation of the oil collecting tray, the oil is guided within the collection space to corresponding oil supply openings, through which it reaches corresponding channel bores in the respective bearing bolts, through which it in turn reaches the region of the bearings of the planet gears, usually needle bearings, for lubrication purposes.

Due to the ever smaller installation space available as a result of compacting within the transmission, efforts are made to design such an oil collecting tray to be as simple and narrow or small as possible. Therefore, for the oil collecting tray known from DE 10 2020 102 241 B3, only a disc-shaped or plate-shaped tray bottom is provided, with which the collecting tray rests against the planet carrier and on which several body portions extending radially to the side are formed, on each of which an oil supply opening is provided. A circumferential, annular collecting portion projects from the tray bottom, practically in the manner of an umbrella, which has a relatively low height so that the tray is relatively narrow as viewed axially. In order to attach the collecting tray to the planet carrier, multiple snap elements in the form of elastic, resilient snap hooks are provided on the thin, disc-shaped tray bottom on the side opposite the collecting portion, which are snapped into corresponding bores on the planet carrier for assembly. For this purpose, the collecting tray is pressed adequately firmly against the planet carrier so that the snap hooks deflect and can be inserted. In the final assembly position, they snap outwards again. This pressing-in movement, which necessitates a more complicated alignment and positioning of the snap elements exactly at the bores, can lead to bending of the tray bottom after relatively strong pressure is applied against the planet carrier, as mentioned previously.

DE 102 0201 319 46 A1 1 shows an oil collecting tray with a disc-shaped tray bottom, which has multiple radially protruding body portions with nozzle-like oil supply openings. The tray bottom forms a collection space on a first side of the oil collecting tray together with an annular collecting portion in which the oil is collected. Snap elements protrude axially from an opposite but averted second side of the tray bottom. In order to stiffen the arrangement, at least one axially projecting rib is provided on the first side, opposite a snap element in each case.

A further oil collecting tray is shown in DE 10 2011 005 724 A1. This oil collecting tray has a radial passage slot for oil. The snap elements are formed at the level of the slot on one side of the oil collecting tray facing the planet carrier. The slot is bridged axially at the rear of the snap elements with ribs so that it is not compressed when the oil collecting tray is mounted on the planet carrier.

SUMMARY

The oil collecting tray according to the present disclosure, which may be annular in shape but can also have any other shape within the scope of the following features, includes the formation of several axially projecting ribs, which are formed on the side on which the collecting portion also projects from the tray bottom. Here, the ribs are positioned in such a way that they each face a snap element provided on the other side and each snap element is attached to the tray bottom in a recess provided on the second side. On the oil collecting tray according to the disclosure, each snap element or snap hook is arranged in a recess provided on the second side of the tray bottom, i.e., the root of the snap element or snap hook is located in this recess, but not in the actual disc plane, which protrudes slightly further axially.

Each rib reinforces or stiffens the tray bottom in the region of the respective snap element, such that the tray bottom is stiffer overall during assembly and is stiffened accordingly, for example, in the regions where a lot of force is applied due to the insertion of the snap elements into the bores on the planet carrier side. As a result, there is no longer significant deformation of the tray bottom when the collecting tray is mounted. Instead, only the snap elements deflect accordingly, but not the tray bottom itself.

In addition, these ribs also serve as an assembly aid. As described, a rib is assigned opposite each snap element. As the ribs are provided on the side facing away from the planet carrier, i.e., the "visible side" during assembly, the person carrying out the assembly can recognize the exact position of the snap elements and position them precisely in relation to the planet carrier bores without actually seeing them, simply due to the visibility of the ribs.

The ribs therefore have a dual function. On the one hand, they serve to reinforce or stiffen the oil collecting tray, e.g., in the regions critical for assembly, and on the other hand they serve as an assembly or alignment aid.

Each rib projects axially from the side surface or plane of the first side of the tray bottom as described. In this regard, each rib expediently extends radially, i.e., it is oriented as a straight, elongated rib with a radial alignment to the center or axis of rotation of the oil collecting tray. However, the term "radial" is also to be understood as encompassing a slight inclination with respect to the exact radial direction, for example by +/−5 degrees.

In this context, each rib may be connected to the collecting portion, i.e., it is directly connected to the tray bottom on the one hand and to the collecting portion on the other. This makes it possible to design the rib with a corresponding height, also axially, i.e., at most up to the height of the collecting portion, while at the same time ensuring high stability and rigidity of the rib, as it is practically connected on two sides, namely on the bottom and laterally.

Furthermore, each rib may extend to the outer circumference of the tray bottom, i.e., has a maximum length, which supports and stiffens the tray bottom. Viewed in the radial direction, the rib can be formed in a slightly rounded manner, i.e., narrowing slightly towards the outer circumference.

Each snap element itself may be implemented in the form of a, for example, semi-circular, snap hook. Such a snap hook, which may also be semi-circular, is sufficiently elastic in order to be inserted into the bore on the carrier side and snapped into place there. Alternatively, each snap element can also be formed from two resilient snap hooks, which may be positioned in a semi-circular arrangement. In this case, each snap element is provided in two parts, with each snap hook extending at an angle of 75 degrees, for example. This gives the snap element greater elasticity than with a single-part semi-circular design, as each individual snap hook is naturally slightly more elastic than a single 180° circumferential snap hook, for example.

As described, the snap elements, for example the respective snap hook or the respective pair of snap hooks, protrude axially out of the disc plane on the second side. The snap element or snap hook is provided with a corresponding hook portion that engages behind the planet carrier in the assembly position. This means that the snap hook is undercut accordingly, wherein as much undercut as possible should be provided in order to engage behind the planet carrier sufficiently and with a high holding force. However, the undercut that can be realized on the snap element is influenced and also limited by the maximum admissible strain of the plastic material from which the oil collecting tray and thus also the snap hooks are formed.

The snap element or snap hook flexes accordingly during the assembly of the collecting tray as a result of insertion into the carrier bore. This leads to a corresponding deformation and bending, which in turn results in an outer fiber strain of the material of the snap element. This outer fiber strain must be less than the admissible strain of the plastic material, as otherwise irreversible deformation or tearing may occur. The outer fiber strain, i.e., ultimately the degree of deformation or bending, depends, among other things, on the length of the snap element or snap hook. The element or hook length influences the outer fiber strain quadratically.

Due to the fact that in the oil collecting tray according to the disclosure each snap element or each snap hook is arranged in a recess provided on the second side of the tray bottom, i.e., the root of the snap element or snap hook is located in this recess, but not in the actual disc plane, which protrudes slightly further axially, the snap element or snap hook is therefore slightly longer, which in turn results in the snap element being less strongly bent or deflected during assembly and consequently the outer fiber strain is less. Thus, a sufficiently large or, in comparison with a conventional oil collecting tray, also a slightly larger undercut can be realized without great difficulty, while at the same time ensuring that only an elastic deformation of the snap elements occurs during assembly, but not a plastic deformation up to possible damage.

Furthermore, each snap element can be connected to the tray bottom via a radially widening base. The base of each snap element or snap hook, i.e., the root region with which the snap element is connected to the tray bottom, is widened radially in accordance with the disclosure, i.e., a correspondingly wide support base is provided. This is possible according to the disclosure, as the base of the respective snap element is accommodated in the recess. It therefore does not bear against the planet carrier and therefore cannot block or hinder the assembly process. This formation of such a stable, wide support base, which leads to an extension of the snap hook base radius, which also has a linear influence on the outer fiber strain, is not possible with known oil collecting trays, where the snap hook protrudes directly from the disc plane, as there is always the problem that the base region, which is slightly widened due to manufacturing reasons, runs axially against the planet carrier or bears against the possibly sharp bore edge. It therefore blocks the full movement up to the flat contact of the disc bottom on the planet carrier, so that a narrow gap can remain, which is not desirable, not least for reasons of tightness. However, this is not possible with the collecting tray according to the disclosure due to the arrangement of the support base in the recess, i.e., the recessed arrangement, which means that the disc bottom can be brought into full-surface contact with the planet carrier. As such, the base radius of the snap element is no longer directly limited by the edge break of the planet carrier bore, but can be made much larger.

As a result, the arrangement of the respective snap element in the recess, in conjunction with the widened support base, means that the undercut can be made correspondingly large or enlarged and, as a result, the latching with the planet carrier can be improved.

The collecting portion itself may project in the manner of an umbrella from the tray bottom and is drawn radially inwards at least in portions. In this regard, the degree of retraction or bending by which the collecting portion is drawn radially inwards should not be selected to be too large, at least locally, which offers advantages for the demolding of the oil collecting tray produced in a mold using a plastic injection molding process. This is because the lower, at least locally, this degree of retraction or bending is, i.e., the less undercut there is locally, the easier it is to achieve a purely axial demolding from the injection mold, which can also be designed more simply, as no demolding sliders need to be provided on the mold side in these regions. Only in the regions of the body portions where the oil supply openings are provided is the collecting portion drawn inwards or undercut to a corresponding extent. Corresponding mold sliders must be provided in this region, as an axial deformation is not possible there.

In this regard, the tray bottom may be drawn further radially inwards the closer it extends with respect to a body portion. The collecting portion may extend centrally between two body portions vertically to the first side and from there is increasingly drawn radially inwards. This means that an axial demolding without sliders is possible around almost the entire circumference of the collecting portion and a corresponding slider only needs to be provided in the three or four collecting portion regions, for example, where the oil supply openings open. Compared to oil collecting trays known from the prior art, such as known from DE 10 2020 102 241 B3, where the collecting portion is drawn radially inwards around its entire circumference, no demolding over the entire circumference with inner sliders is necessary with the tray according to the disclosure, which leads to a reduction in the touching and adjusting surfaces in the mold, which increases the robustness of the injection molding process and also simplifies the mold mechanics.

BRIEF DESCRIPTION OF THE DRAWINGS

The present disclosure is explained below on the basis of exemplary embodiments with reference to the drawings. The drawings are schematic representations, in which:

FIG. 5 shows an enlarged partial view of the oil collecting tray, with a view of the lower second side.

DETAILED DESCRIPTION

Figure 1:
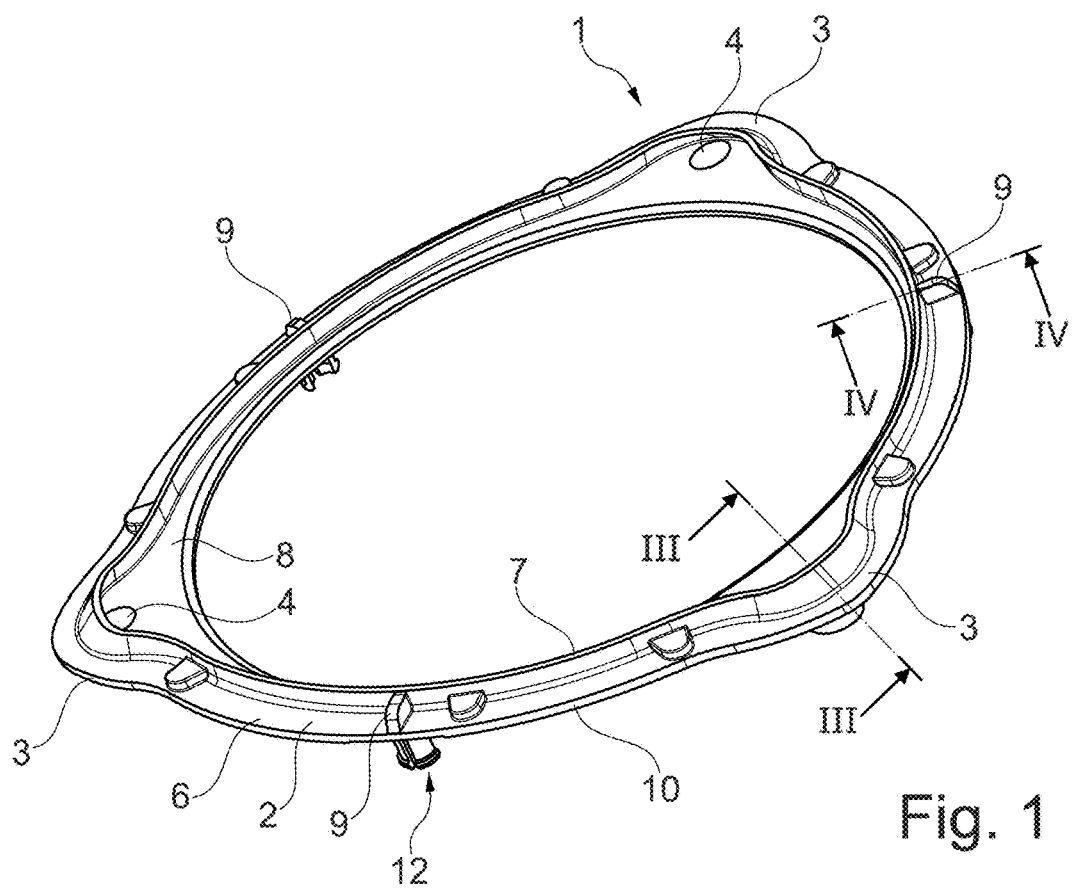
FIG. 1 shows a perspective view of an oil collecting tray according to the disclosure, with a view of the upper first side.
Figure 2:
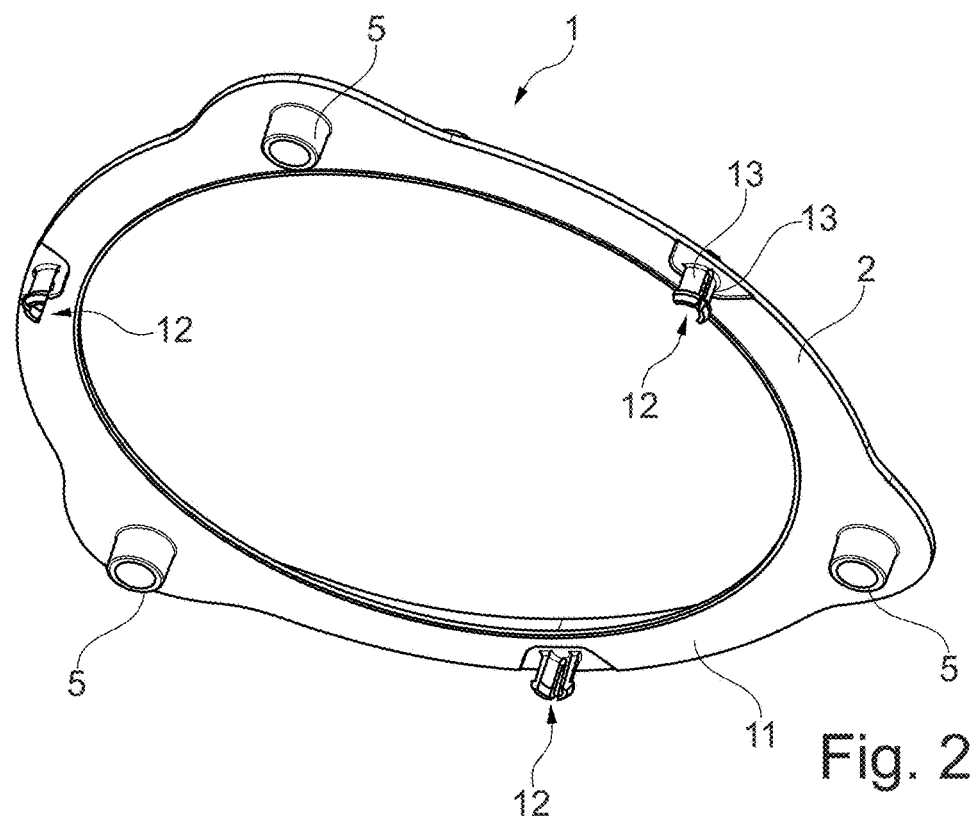
FIG. 2 shows a perspective view of the oil collecting tray from FIG. 1, with a view of the underside.

FIG. 1 shows an oil collecting tray 1 according to the disclosure, which is manufactured as an injection-molded part made of plastic. The oil collecting tray 1 comprises an annular and disc-shaped tray bottom 2, which is formed practically as cloverleaf-shaped and has three radially protruding body portions 3 in the example shown. An oil supply opening 4 is formed on each body portion 3, which passes through an axially projecting supply nozzle 5 (ref. FIG. 2) on the opposite side of the tray bottom 2 in each case, which in the assembly position engages in a corresponding channel bore of a bearing bolt of a planet carrier.

Furthermore, an annular collecting portion 7 projects on the first side 6 of the tray bottom 2 visible in FIG. 1, which, together with the tray bottom 2, defines and radially delimits a substantially channel-like collection space 8. The shape of the collecting portion 7 corresponds approximately to the shape of the tray bottom 2, i.e., the collecting portion 7 is guided according to the geometry of the tray bottom 2 and also extends radially outwards at the body portions 3 and around the oil supply openings 4. During operation, when the oil collecting tray 1 is fixed to a planet carrier of a planetary gearbox, the oil collecting tray rotates at a corresponding speed. Any oil splashing around is collected in the collection space 8 and directed into the widening portions of the collection space 8 in the region of the oil supply openings 4 as a result of rotational or centrifugal forces, where it flows into the supply nozzles 5 and from there into the channel bores of the bearing bolts.

Multiple ribs 9 are formed on the first side 6 of the tray bottom 2, three in the example shown, which are radially aligned and extend to the outer circumference 10 of the tray bottom 2. They are further formed on or attached to the outer side of the collecting portion 7 and ultimately extend to the upper edge of the collecting portion 7. They are rounded towards the outer circumference 10, so that they do not have a sharp corner.

On the opposite, second side 11 of the tray bottom 2, three snap elements 12 are also formed in the example shown, each consisting of two snap hooks 13 in the example shown. Each snap hook 13, see also FIG. 5 in this regard, is radially widened at its free end and has a corresponding hook portion 14, with which it engages behind a corresponding bore in the planet carrier in the assembly position, so that the oil collecting tray 1 can be snapped onto the planet carrier.

As FIG. 1 shows, but also as FIG. 5 shows, a rib 9 is arranged axially opposite a snap element 12 in each case, only on the other side. This results in the tray bottom 2 being locally stiffened in this region, which in turn means that when the oil collecting tray 1 is assembled, during which assembly the oil collecting tray 1 is pressed forcefully against the planet carrier so that the snap hooks 13 can deflect and bend accordingly, there is no deformation of the oil collecting tray 1 or the tray bottom 2 in this region, where the highest amount of force is applied. The corresponding radial arrangement and the length and height of the ribs 9 ensure that there is no significant deformation in this region. At the same time, the ribs 9 also serve as assembly or alignment aids. This is because, since each rib 9 is assigned to exactly one snap element 12, the person carrying out the assembly can recognize the exact position of the snap elements without seeing them, so that he can nevertheless align them precisely with respect to the bores on the planet carrier side.

Figure 3:
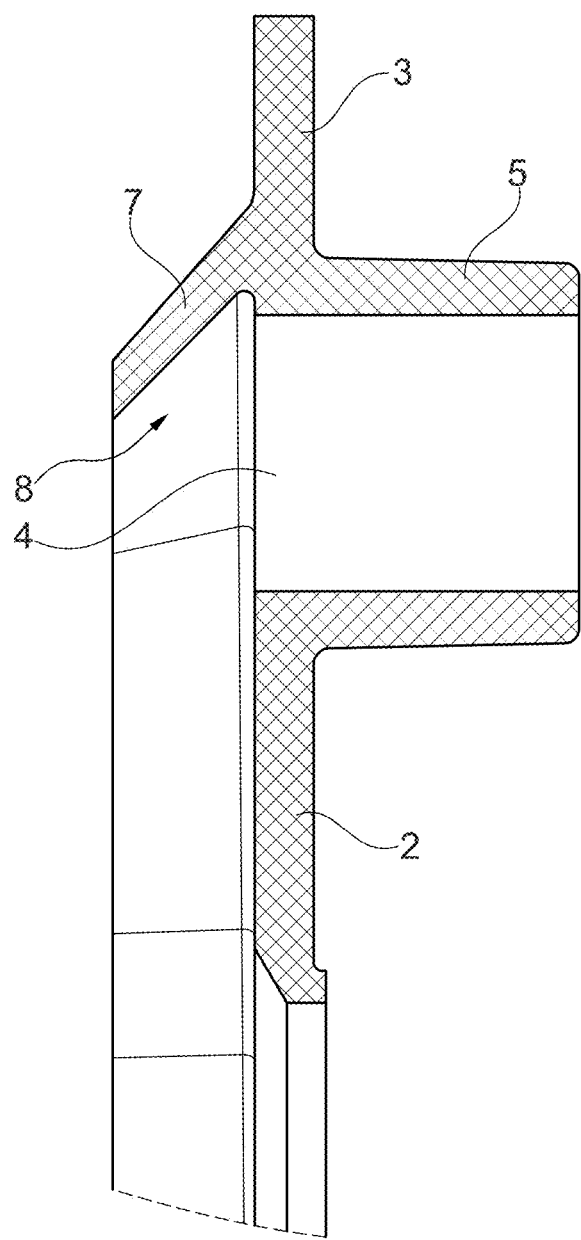
FIG. 3 shows a sectional view along plane III-III in FIG. 1.
Figure 4:
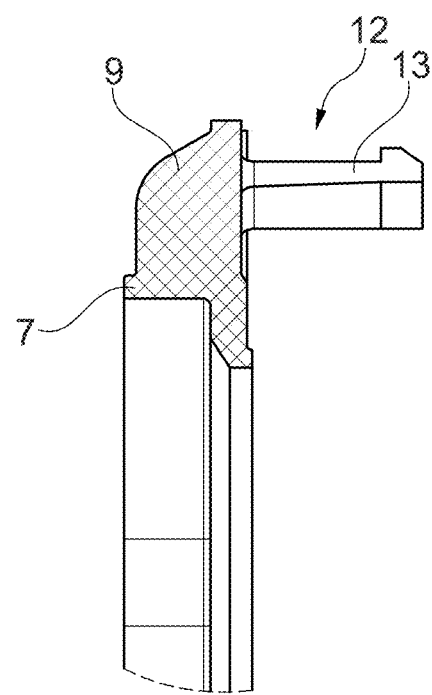
FIG. 4 shows a sectional view along the plane IV-IV in FIG. 1.

As described, the collecting portion 7 projects from the plane of the first side 6. It is formed in a manner akin to an umbrella, i.e., it is drawn radially inwards. However, the degree to which the collecting portion 7 is drawn inwards changes from portion to portion, including portions where the collecting portion 7 only extends vertically, i.e., is not drawn inwards. FIGS. 3 and 4 show two sectional views showing this varying course.

FIG. 3 shows a sectional view along the line III-III in FIG. 1. This sectional plane extends through a body portion 3 as well as the corresponding oil supply opening 4 and the supply nozzle 5. As FIG. 3 shows, the collecting portion 7 is drawn strongly radially inwards here and it ultimately extends diagonally inwards so that the oil collecting chamber 8 is strongly overlapped there. The maximum retaining height is also reached in this region, since the height of the collecting portion 7 can also vary around the circumference. Therefore, the height is at its maximum here.

The conditions are different at the position shown in FIG. 4, which shows the sectional view along the line IV-IV. Here, the sectional plane extends through a snap element 12, of which only one snap hook 13 is shown, and through the opposite rib 9. It can be seen that the collecting portion 7 only extends vertically here, it is not drawn inwards radially. The collecting portion 7 is also slightly lower here compared to FIG. 3, but this is optional. This means that the height of the collecting portion 7 varies around the circumference, as does the undercut, which increases steadily from the position shown in FIG. 4 to the position shown in FIG. 3, which, however, therefore also applies to the retaining region.

FIG. 5 shows an enlarged partial view of the oil collecting tray 1 from the above figures, with a view of the lower second side 11. The second side 11 is provided locally with recesses 15, wherein a snap element 12, in this case two snap hooks 13, is/are arranged in each recess 15, i.e., is/are attached to the tray bottom 2 with their corresponding base 16 in the recess. Consequently, three recesses 15 are provided in the present case as three snap elements 12 are provided. The recess 15 is necessarily recessed slightly with respect to the surface of the second side 11. In the assembly position, the disc surface bears flat against the planet carrier. As a result, as the snap elements 12 are formed on the bottom 17 of the recess, they are inevitably somewhat longer than if they were formed on the second side 11 or its side surface coming into contact with the planet carrier. This in turn means that each snap element 12 or snap hook 13 is bent less during assembly, i.e., during its insertion into the opening on the planet carrier side, as it is longer compared to the arrangement on the surface of the side 6, where it would be slightly shorter. This lower degree of bending means that the outer fiber strain is reduced and the undercut, formed by the radial hook-shaped widening 14, can be slightly larger than with shorter snap elements.

In addition, as FIG. 5 shows, the base 16 is also radially widened, which means that the support base of each snap hook 13 can be made wider in relation to the bottom 17, as this widened portion is, in turn, accommodated in the recess 15 and therefore does not run against the planet carrier surface in a blocking manner. The edge break of the corresponding bore in the planet carrier, into which the snap element is snapped, therefore does not limit the dimensioning of the base 16, as this is recessed in the recess 15, as already mentioned, so that the base radius of each snap hook 13 can be made larger. Although the thickness of the tray bottom 2 is slightly reduced in the region of the recess 15, this does not affect the stiffness of the tray bottom 2, as the ribs 9, which stiffen and support the tray bottom 2 both locally and overall, are formed in this region of the recess 15 on the other side.

REFERENCE NUMERALS

1 Oil collecting tray
2 Tray bottom
3 Body portion
4 Oil supply opening
5 Supply nozzle
6 First side
7 Collecting portion
8 Collection space
9 Rib
10 Outer circumference
11 Second side
12 Snap element
13 Snap hook
14 Radial widening
15 Recess
16 Base
17 Bottom

The invention claimed is:

1. An oil collecting tray, having a disc-shaped tray bottom which has multiple radially protruding body portions, on each of which an oil supply opening is provided, and an annular collecting portion which axially projects from the tray bottom on a first side and which defines, together with the tray bottom, a collection space which is delimited radially outwards, and multiple snap elements which axially protrude on a second side of the tray bottom opposite the first side, which are provided in the region between two adjacent body portions, wherein at least one axially protruding rib is provided on the first side, in each case opposite a snap element, the second side is provided locally with recesses and each snap element is connected to the tray bottom in one of the recesses provided on the second side.

2. The oil collecting tray according to claim 1, wherein each rib extends radially.

3. The oil collecting tray according to claim 1, wherein each rib is connected to the collecting portion.

4. The oil collecting tray according to claim 3, each rib extends to an outer circumference of the tray bottom.

5. The oil collecting tray according to claim 1, wherein each snap element is implemented in the form of a, snap hook, or each snap element consists of two resilient snap hooks.

6. The oil collecting tray according to claim 5, wherein each snap element is connected to the tray bottom via a radially widening base.

7. The oil collecting tray according to claim 1, wherein the collecting portion projects in the manner of an umbrella from the tray bottom and is drawn radially inwards at least in portions.

8. The oil collecting tray according to claim 7, wherein the collecting portion is drawn further radially inwards the closer it extends with respect to a body portion.

9. The oil collecting tray according to claim 8, wherein the collecting portion extends centrally between two body portions vertically to the first side and from there is increasingly drawn radially inwards.

10. An oil collecting tray, comprising:
   a disc-shaped tray bottom comprising:
      a first side and a second side, opposite the first side; and
      a plurality of radially protruding body portions, each one of the plurality of radially protruding body portions comprising an oil supply opening;
   an annular collecting portion projecting axially from the first side, the annular collecting portion and the disc-shaped tray bottom arranged to define a collection space, and the annular collecting portion delimiting a radial outside of the collection space;
   a plurality of recesses arranged on the second side, each one of the plurality of recesses arranged between a pair of the radially protruding body portions;
   a plurality of snap elements, each one of the plurality of snap elements protruding axially from a one of the plurality of recesses; and
   a plurality of axially protruding ribs arranged on the first side, each one of the plurality of axially protruding ribs arranged opposite a one of the plurality of snap elements.

11. The oil collecting tray of claim 10, wherein each one of the plurality of axially protruding ribs extends radially.

12. The oil collecting tray of claim 10, wherein each one of the plurality of axially protruding ribs connects to the annular collecting portion.

13. The oil collecting tray of claim 12, wherein each one of the plurality of axially protruding ribs extends to an outer circumference of the disc-shaped tray bottom.

14. The oil collecting tray of claim 10, wherein:
   each one of the plurality of snap elements comprises:
      a semi-circular snap hook; or
      a pair of resilient snap hooks positioned semi-circularly.

15. The oil collecting tray of claim 14, wherein each one of the plurality of snap elements comprises a radially widening base connected to the disc-shaped tray bottom.

16. The oil collecting tray of claim 10, wherein the annular collecting portion:
   projects from the disc-shaped tray bottom like an umbrella; and
   comprises portions that are drawn radially inward.

17. The oil collecting tray of claim 16, wherein the portions are drawn further radially inwards closer to each one of the plurality of radially projecting body portions.

18. The oil collecting tray of claim 16, wherein the annular collecting portion:
   is vertical between two of the plurality of radially extending body portions; and
   extends further radially inwards approaching each one of the two of the plurality of radially extending body portions.

* * * * *